(12) United States Patent
Jia

(10) Patent No.: US 12,327,364 B2
(45) Date of Patent: Jun. 10, 2025

(54) GENERATING A FUSED OBJECT BOUNDING BOX BASED ON UNCERTAINTY

(71) Applicant: Aptiv Technologies AG, Schaffhausen (CH)

(72) Inventor: Bin Jia, Columbia, MD (US)

(73) Assignee: Aptiv Technologies AG, Schaffhausen (CH)

( * ) Notice: Subject to any disclaimer, the term of this patent is extended or adjusted under 35 U.S.C. 154(b) by 491 days.

(21) Appl. No.: 17/804,074

(22) Filed: May 25, 2022

(65) Prior Publication Data

US 2023/0230255 A1 Jul. 20, 2023

Related U.S. Application Data

(60) Provisional application No. 63/266,976, filed on Jan. 20, 2022.

(51) Int. Cl.
G06K 9/00 (2022.01)
B60W 60/00 (2020.01)
(Continued)

(52) U.S. Cl.
CPC ............ *G06T 7/20* (2013.01); *B60W 60/001* (2020.02); *G01S 7/41* (2013.01); *G01S 7/415* (2013.01);
(Continued)

(58) Field of Classification Search
None
See application file for complete search history.

(56) References Cited

U.S. PATENT DOCUMENTS

| 8,705,797 | B2 * | 4/2014 | Zeng | ...................... G01S 13/931 |
| | | | | 348/169 |
| 9,483,701 | B1 * | 11/2016 | Kwatra | ................ G06V 10/255 |

(Continued)

FOREIGN PATENT DOCUMENTS

| CN | 107067755 | A | * | 8/2017 | |
| CN | 109341697 | A | * | 2/2019 | ............. G01C 21/20 |

(Continued)

OTHER PUBLICATIONS

Feng et al., "Towards safe autonomous driving: Capture uncertainty in the deep neural network for lidar 3d vehicle detection." In 2018 21st international conference on intelligent transportation systems (ITSC), pp. 3266-3273. IEEE, 2018. (Year: 2018).*

(Continued)

*Primary Examiner* — Feng Niu
(74) *Attorney, Agent, or Firm* — Harness, Dickey & Pierce, P.L.C.

(57) ABSTRACT

This document describes techniques and systems for generating a fused object bounding box based on uncertainty. At least two bounding boxes, each associated with a different sensor, is generated. A fused center point and yaw angle as well as length, width, and velocity can be found by mixing the distributions of the parameters from each bounding box. A discrepancy between the center points of each bounding box can be used to determine whether to refine the fused bounding box (e.g., find an intersection between at least two bounding boxes) or consolidate the fused bounding box (e.g., find a union between at least two bounding boxes). This results in the fused bounding box having a confidence level of the uncertainty associated with the fused bounding box. In this manner, better estimations of the uncertainty of the fused bounding box may be achieved to improve tracking performance of a sensor fusion system.

19 Claims, 6 Drawing Sheets

(51) Int. Cl.
 G01S 7/41 (2006.01)
 G01S 7/48 (2006.01)
 G01S 13/72 (2006.01)
 G01S 13/86 (2006.01)
 G01S 13/89 (2006.01)
 G01S 13/931 (2020.01)
 G01S 17/66 (2006.01)
 G01S 17/86 (2020.01)
 G01S 17/931 (2020.01)
 G06T 7/20 (2017.01)
 G06T 7/70 (2017.01)
 G06V 10/25 (2022.01)
 G06V 20/58 (2022.01)

(52) U.S. Cl.
 CPC .......... *G01S 7/4802* (2013.01); *G01S 7/4808* (2013.01); *G01S 13/723* (2013.01); *G01S 13/86* (2013.01); *G01S 13/89* (2013.01); *G01S 13/931* (2013.01); *G01S 17/66* (2013.01); *G01S 17/86* (2020.01); *G01S 17/931* (2020.01); *G06T 7/70* (2017.01); *G06V 10/25* (2022.01); *G06V 20/58* (2022.01); *B60W 2420/403* (2013.01); *B60W 2420/408* (2024.01); *B60W 2556/35* (2020.02); *G06T 2207/30252* (2013.01)

(56) References Cited

U.S. PATENT DOCUMENTS

| | | | | |
|---|---|---|---|---|
| 10,019,633 | B2* | 7/2018 | Chen | G06F 18/22 |
| 10,229,503 | B2* | 3/2019 | Chen | G06T 7/70 |
| 10,748,035 | B2* | 8/2020 | Lee | G06V 10/82 |
| 10,936,902 | B1 | 3/2021 | Bagwell et al. | |
| 11,080,562 | B1* | 8/2021 | Saxena | G06V 10/451 |
| 11,429,111 | B2* | 8/2022 | Medeiros | G05D 1/0257 |
| 11,506,502 | B2* | 11/2022 | Demir | G01C 21/28 |
| 11,681,293 | B2* | 6/2023 | van der Merwe | G05D 1/0212 701/24 |
| 11,941,836 | B2* | 3/2024 | Niesen | G06V 10/803 |
| 12,091,056 | B2* | 9/2024 | Ramakrishnan | B60W 60/00276 |
| 2013/0236047 | A1 | 9/2013 | Zeng et al. | |
| 2018/0046865 | A1* | 2/2018 | Chen | G06T 7/20 |
| 2018/0047193 | A1* | 2/2018 | Gao | G06T 7/70 |
| 2018/0253848 | A1* | 9/2018 | Chen | G06T 7/11 |
| 2019/0361460 | A1* | 11/2019 | Medeiros | G05D 1/00 |
| 2020/0012894 | A1* | 1/2020 | Lee | G06F 18/24 |
| 2021/0010814 | A1* | 1/2021 | Demir | G01C 21/28 |
| 2021/0331695 | A1* | 10/2021 | Ramakrishnan | B60W 60/001 |
| 2022/0299626 | A1* | 9/2022 | Chen | G01S 7/412 |
| 2022/0405952 | A1* | 12/2022 | Niesen | G06T 7/70 |
| 2023/0230255 | A1* | 7/2023 | Jia | G01S 13/931 382/103 |
| 2023/0350034 | A1* | 11/2023 | Serafin | G01S 17/931 |

FOREIGN PATENT DOCUMENTS

| | | | | |
|---|---|---|---|---|
| CN | 116465415 A | * | 7/2023 | .......... B60W 60/001 |
| EP | 4215933 A1 | * | 7/2023 | .......... B60W 60/001 |
| WO | WO-2018020045 A1 | * | 2/2018 | .......... G01S 13/867 |
| WO | 2018148195 A1 | | 8/2018 | |

OTHER PUBLICATIONS

Osep et al., "Combined image- and world-space tracking in traffic scenes," 2017 IEEE International Conference on Robotics and Automation (ICRA), Singapore, 2017, pp. 1988-1995 (Year: 2017).*
Duraisamy et al., "Track level fusion of extended objects from heterogeneous sensors," 2016 19th International Conference on Information Fusion (Fusion), Heidelberg, Germany, 2016, pp. 876-885. (Year: 2016).*
Cho et al., "A multi-sensor fusion system for moving object detection and tracking in urban driving environments." In 2014 IEEE international conference on robotics and automation (ICRA), pp. 1836-1843. IEEE, 2014. (Year: 2014).*
Zhang et al., "Extending Reliability of mmWave Radar Tracking and Detection via Fusion With Camera," in IEEE Access, vol. 7, pp. 137065-137079, 2019 (Year: 2019).*
Nilsson et al., "Object level fusion of extended dynamic objects," 2016 IEEE International Conference on Multisensor Fusion and Integration for Intelligent Systems (MFI), Baden-Baden, Germany, 2016, pp. 251-258 (Year: 2016).*
Zhuang et al., "Bounding Box Distribution Learning and Center Point Calibration for Robust Visual Tracking," ICASSP 2022-2022 IEEE International Conference on Acoustics, Speech and Signal Processing (ICASSP), Singapore, Singapore, 2022, pp. 4718-4722 (Year: 2022).*
Mertz et al., "Moving object detection with laser scanners." Journal of Field Robotics 30, No. 1 (2013): 17-43. (Year: 2013).*
Azim et al., "Detection, classification and tracking of moving objects in a 3D environment." In 2012 IEEE Intelligent Vehicles Symposium, pp. 802-807. IEEE, 2012. (Year: 2012).*
EP 4215933 A1 (machine translation) (Year: 2023).*
CN 116465415 A (machine translation) (Year: 2023).*
CN 107067755 A (machine translation) (Year: 2017).*
CN 109341697 A (machine translation) (Year: 2019).*
Reece, et al., "Generalised Covariance Union: A Unified Approach to Hypothesis Merging in Tracking", IEEE Transactions on Aerospace and Electronic Systems, vol. 46, No. 1, Jan. 2010, pp. 207-221.
Yang, et al., "Rethinking Rotated Object Detection with Gaussian Wasserstein Distance Loss", Nov. 16, 2021, 15 pages.
"Extended European Search Report", EP Application No. 22197732.5, Mar. 7, 2023, 18 pages.
"Track-Level Fusion of Radar and Lidar Data", MathWorks, Retrieved from https://www.mathworks.com/help/releases/R2020a/fusion/examples/track-level-fusion-of-radar-and-lidar-data.html on Mar. 6, 2023, 22 pages.
Gu, et al., "Merging Scored Bounding Boxes with Gaussian Mixture Model for Object Detection", Proceedings of the 6th IIAE International Conference on Intelligent Systems and Image Processing 2018, pp. 249-255.

* cited by examiner

GENERATING A FUSED OBJECT BOUNDING BOX BASED ON UNCERTAINTY

CROSS-REFERENCE TO RELATED APPLICATION

This application claims the benefit of U.S. Provisional Patent Application No. 63/266,976, filed Jan. 20, 2022, which is incorporated by reference herein in its entirety.

BACKGROUND

In some automobiles, a sensor fusion system (e.g., a fusion tracker) may combine information obtained from multiple sensors to support autonomous or semi-autonomous controls. The fused sensor data can be used to infer position, velocity, trajectory, size, class, and other parameters of objects within a field-of-view of the sensors. Sensor fusion is critical for environmental perception and trajectory; however, over-estimation or under-estimation of the uncertainty of the sensor data being fused may lead to poor fusion tracking performance.

SUMMARY

This document describes techniques and systems for generating a fused object bounding box based on uncertainty. At least two bounding boxes, each associated with a different sensor, is generated. A fused center point and yaw angle, as well as length, width, and velocity, can be found by mixing the distributions of the parameters from each bounding box. A discrepancy can be found between the center points of each bounding box and is used to determine whether to refine the fused bounding box (e.g., find an intersection between the at least two bounding boxes) or consolidate the fused bounding box (e.g., find a union between the at least two bounding boxes). This results in the fused bounding box having a confidence level of the uncertainty associated with the fused bounding box. In this manner, better estimations of the uncertainty of the fused bounding box may be achieved to improve tracking performance of a sensor fusion system.

Aspects described below include generating a fused bounding box based on uncertainty. In one example, a method includes obtaining, based on first sensor data from a first sensor, a first bounding box for an object in a field of view of the first sensor. The method further includes obtaining, based on second sensor data from a second sensor, a second bounding box for the object in a field of view of the second sensor. The method further includes quantifying, based on at least one parameter of the first bounding box and at least one parameter of the second bounding box, an uncertainty associated with the first bounding box and the second bounding box. The method further includes generating, based on the quantified uncertainty, a fused bounding box for the object. The method further includes outputting the fused bounding box for tracking the object.

These and other described techniques may be performed by hardware or a combination of hardware and software executing thereon. For example, a computer-readable storage media (CRM) may have instructions stored thereon and that when executed configure a processor to perform the described techniques. A system may include means for performing the described techniques. A processor or processor unit may be part of a system that is configured to execute the methods and techniques described herein.

Through implementation of these and other examples contemplated by this disclosure, stability in an object tracker can be achieved by generating a fused object bounding box based on uncertainty. This Summary introduces simplified concepts related to generating a fused object bounding box based on uncertainty, further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of generating a fused object bounding box based on uncertainty are described in this document with reference to the following figures that may use same numbers to reference like features and components, and hyphenated numbers to designate variations of these like features and components. The Drawings are organized as follows.

DETAILED DESCRIPTION

Overview

Automotive technology is successfully increasing autonomy and safety. One way to achieve this includes equipping vehicles with many different types of sensors, including optical cameras, radar systems, and light detection and ranging (LiDAR) systems. The sensors collect data that are processed by sensor fusion systems to generate tracks or bounding boxes, representing different objects in the environment surrounding the vehicle. These objects may be dynamic or stationary and may include pedestrians, animals, other vehicles, vegetation, buildings, street signs, and many other elements that may exist in the environment.

Bounding boxes associated with different sensors can be fused to generate a fused bounding box. Fused bounding boxes can take advantage of the strengths of the different types of sensors and minimize the weaknesses. However, current methods for fusing bounding boxes have some drawbacks. The fusion process may not consider the uncertainty of the sensor data. That is, in any given data frame, data from one sensor may be more accurate than data from another sensor. This can lead to the fused bounding box to only partially encompass the object, or the fused bounding box can become unstable. This instability manifests as the fused bounding box being jittery, or "jumping" around the object.

In contrast, the techniques disclosed below describe generating a fused bounding box based on uncertainty. Multiple sensor-based bounding boxes can serve as input. Parameters of these bounding boxes, including center point, yaw angle, length and width can be compared to one another. The comparison may also include tunable parameters for each bounding box being compared. These tunable parameters may be derived from expert opinion, analysis (e.g., statistical analysis, machine-learning-based analysis) of large test data sets, or by other methods. The comparison of the multiple bounding box results in calculating a discrepancy between the bounding boxes being compared. Based on the size of the discrepancy, either a refined fusion technique or a consolidation fusion technique can be used to fuse the sensor-based bounding boxes.

The refined fusion technique fuses the sensor-based bounding boxes based on the intersection of the normal distributions and/or mean values of the parameters of the sensor-based bounding boxes. The consolidation fusion technique bases the fusion of the sensor-based bounding boxes on the union of the normal distributions of each respective sensor-based bounding box.

The fused bounding box, being generated based on the statistical distributions including the mean values and covariance values of the sensor-based bounding boxes may reduce instability and increase accuracy. By fusing the bounding boxes in this manner, any uncertainty related to each bounding box can be considered to provide a conservative estimate of the location of the object that may result in a safe and reliable tracking system.

Example Environment

Figure 1:
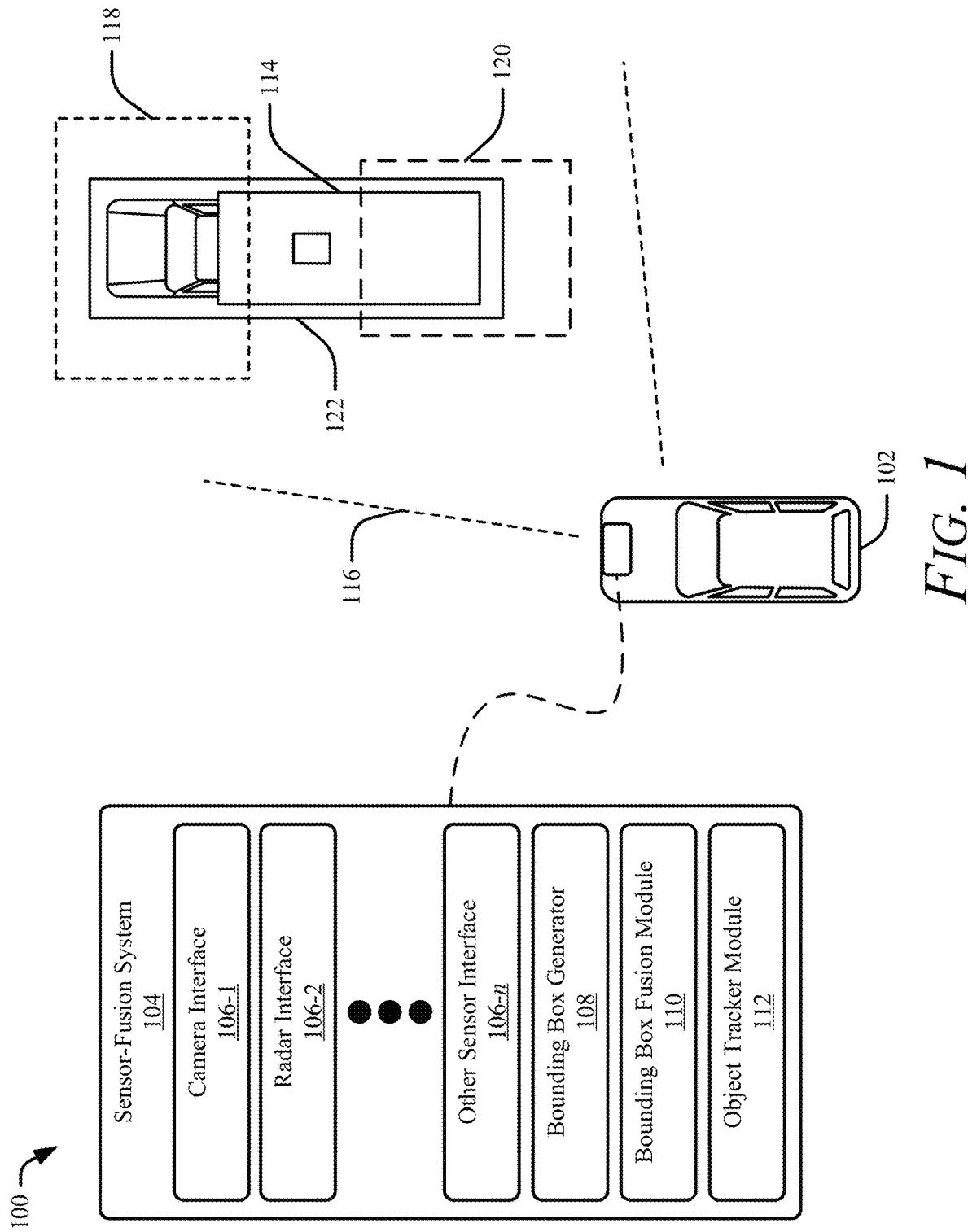
FIG. 1 illustrates an example operating environment of a vehicle that is configured for generating a fused object bounding box based on uncertainty, in accordance with techniques of this disclosure.

FIG. 1 illustrates an example operating environment 100 of a vehicle 102 that is configured for generating a fused object bounding box based on uncertainty, in accordance with techniques of this disclosure. In the depicted environment 100, a sensor-fusion system 104 is mounted to, or integrated within, the vehicle 102. Although illustrated as a car, the vehicle 102 can represent other types of vehicles and machinery (e.g., a motorcycle, a bus, a tractor, a semi-trailer truck, watercraft, aircraft, or other heavy equipment) including manned and unmanned systems that may be used for a variety of purposes.

The sensor-fusion system 104 may include one or more sensor interfaces 106-1 through 106-n (collectively "sensor interfaces 106"), a bounding box generator 108, a bounding box fusion module 110, and an object tracker module 112. In other examples, the operations associated with the radar system 204 can be performed using a different arrangement or quantity of components than that shown in FIG. 1.

The sensor interfaces 106-1 through 106-n may include a camera interface 106-1, a radar interface 106-2, and one or more other sensor interfaces 106-n. Each of the sensor interfaces 106 provides the sensor-fusion system 104 with sensor data of a particular type. For example, the camera interface 106-1 obtains vision data generated by one or more camera sensors, and the radar interface 106-2 obtains radar data from a set of radar sensors in communication with the radar interface 106-2. The vision data and the radar data correspond to objects (e.g., an object 114) within a respective field-of-view (FOV) 116 of the sensors equipped on the vehicle 102.

In general, manufacturers can mount the sensors and the sensor-fusion system 104 to any moving platform that can travel in the environment 100. The sensors can project their respective FOVs from any exterior surface of the vehicle 102. For example, vehicle manufacturers can integrate at least a part of the sensor-fusion system 104 (e.g., the sensors) into a side mirror, bumper, roof, or any other interior or exterior location where the FOV 116 includes a portion of the environment 100 and objects moving or stationary that are in the environment 100. Manufacturers can design the location of the sensors to provide a particular FOV that sufficiently encompasses portions of the environment 100 in which the vehicle 102 may be traveling. In the depicted implementation, a portion of the sensor-fusion system 104 is mounted near the front bumper section of the vehicle 102.

The bounding box generator 108 can receive the vision data and the radar data associated with the object 114 and generate a vision bounding box 118 and a radar bounding box 120. In other aspects, the vision bounding box 118 and the radar bounding box 120 can be generated prior to being received by the sensor fusion system 104 (e.g., each sensor system may include a respective bounding box generator). The bounding box fusion module 110 can receive the vision bounding box 118 and the radar bounding box 120 and fuse them to generate a fused bounding box 122. The fused bounding box 122 can be output to the object tracker module 112 to track objects (e.g., the object 114) in the FOV 116.

The fused bounding box 122 includes uncertainty associated with the vision bounding box 118 and the radar bounding box 120. Since the fused bounding box 122 includes uncertainty inherent in the respective sensor data, the fused bounding box 122 represents a more conservative estimate of the location of the object 114 in any given data frame. By including a quantified uncertainty in the fused bounding box 122, the fused bounding box 122 can be more stable (e.g., less jumping of object positions) and may result in better tracking performance by the object tracker module 112.

Example Systems

Figure 2:
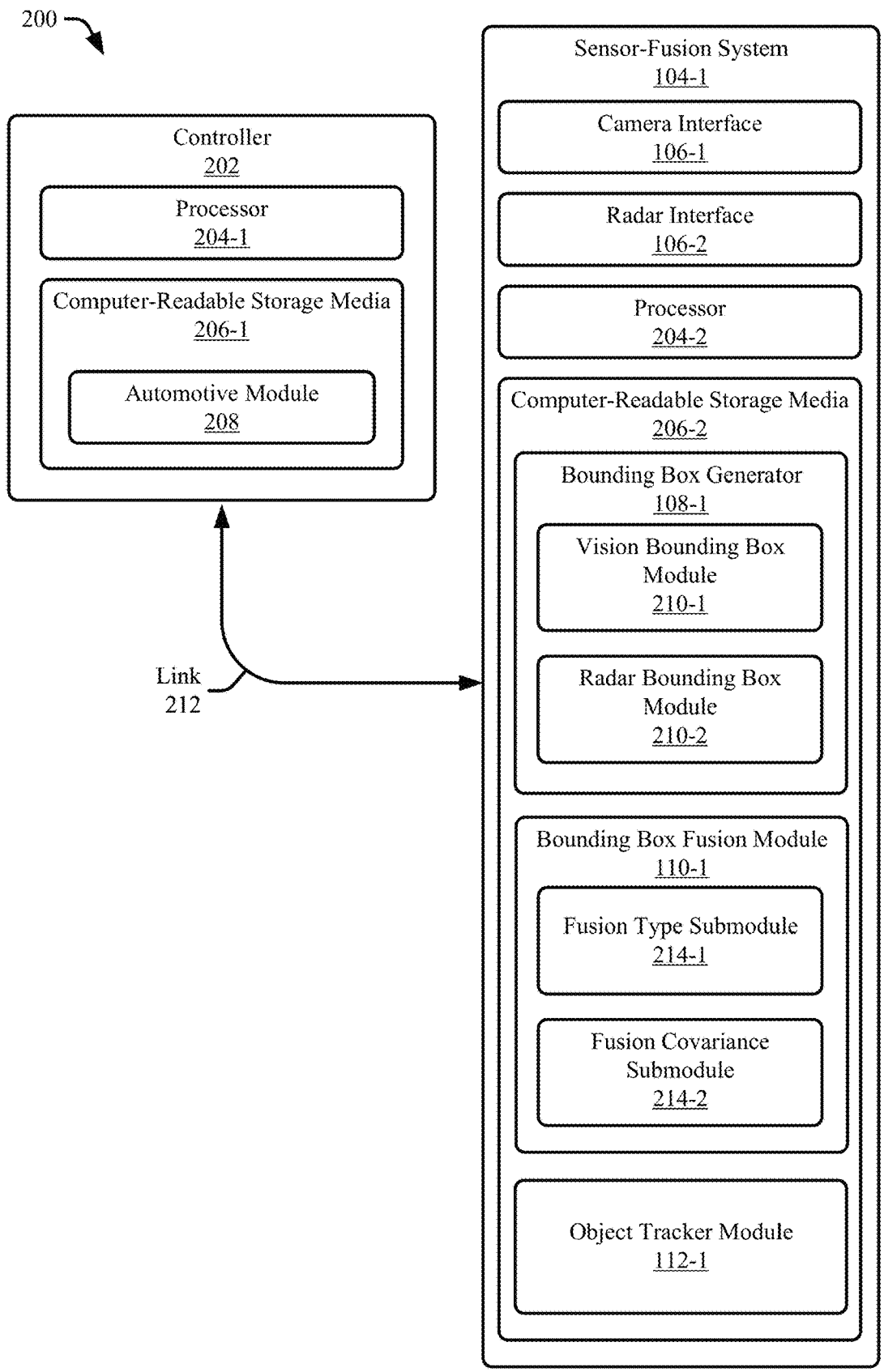
FIG. 2 illustrates an example of an automotive system for generating a fused object bounding box based on uncertainty, in accordance with techniques of this disclosure.

FIG. 2 illustrates an example of an automotive system 200 for generating a fused object bounding box based on uncertainty, in accordance with techniques of this disclosure. The automotive system 200 can be integrated within the vehicle 102. For example, the automotive system 200 includes a controller 202 and a sensor-fusion system 104-1. The sensor-fusion system 104-1 is an example of the sensor-fusion system 104 and can be integrated into an automotive or other vehicular environment. The sensor-fusion system 104-1 and the controller 202 communicate over a link 212. The link 212 may be a wired or wireless link and in some cases includes a communication bus. The controller 202 performs operations based on information received over the link 212, such as data output from the sensor-fusion system 104 as objects in the FOV 116 are identified from processing and fusing sensor data associated with objects.

The controller 202 includes a processor 204-1 and a computer-readable storage medium (CRM) 206-1 (e.g., a memory, long-term storage, short-term storage), which stores instructions for an automotive module 208. The sensor-fusion system 104-1 includes a camera interface 106-1 and a radar interface 106-2. The sensor-fusion system 104-1 may also include other sensor interfaces. The sensor-fusion system 104-1 may include processing hardware that includes a processor 204-2 and a computer-readable storage medium (CRM) 206-2, which stores instructions associated with a bounding box generator 108-1, a bounding box fusion module 110-1, and an object tracker module 112-1.

The bounding box generator 108-1, which is an example of the bounding box generator 108, includes a vision bounding box module 210-1 and a radar bounding box generator 210-2. The bounding box generator 108-1 receives camera data from the camera interface 106-1 related to an object in the FOV of a camera and generates a vision bounding box for the object. Likewise, the bounding box generator 108-1 receives radar data from the radar interface 106-2 related to the object and generates a radar bounding box for the object. In some cases, the vision bounding box and the radar bounding box have parameters (e.g., center point, yaw angle, length, width) with values that are similar. That is, the uncertainty associated with each respective bounding box is relatively small since the discrepancies between the respective parameter values of the bounding boxes are also small. In other cases, the respective parameter values can have a larger discrepancy (e.g., difference). This larger discrepancy leads to more uncertainty related to one or both bounding boxes. Further, the discrepancy can be relatively small in one data frame and relatively large in another data frame. These bounding boxes can be used separately to locate and track objects, or they can be output to the bounding box fusion module 110-1 for further processing.

The bounding box fusion module 110-1, which is an example of the bounding box fusion module 110, includes a fusion type submodule 214-1 and a fusion covariance submodule 214-2. The fusion type submodule 214-1 receives the vision bounding box and the radar bounding box and determines the discrepancy between the parameters of the two bounding boxes. The amount of discrepancy determines whether the fusion type is an intersection fusion (e.g., low uncertainty cases) or a union fusion (e.g., high uncertainty cases). For example, if the discrepancy is below a threshold value, the fusion type is an intersection fusion. Otherwise, the fusion type is a union fusion. Once the fusion type is determined, the fusion covariance submodule determines the covariance of the fused bounding box and generates the fused bounding box. These procedures may be performed on any quantity of bounding boxes derived from multiple different sensor data. The object tracker module 112-1 can use the fused bounding box to track the object in an environment. By basing the fused bounding box on the uncertainty of the separate bounding boxes, the fused bounding may be more stable and robust to noise, and the tracking performance may be improved.

Example Implementations

Figure 3:
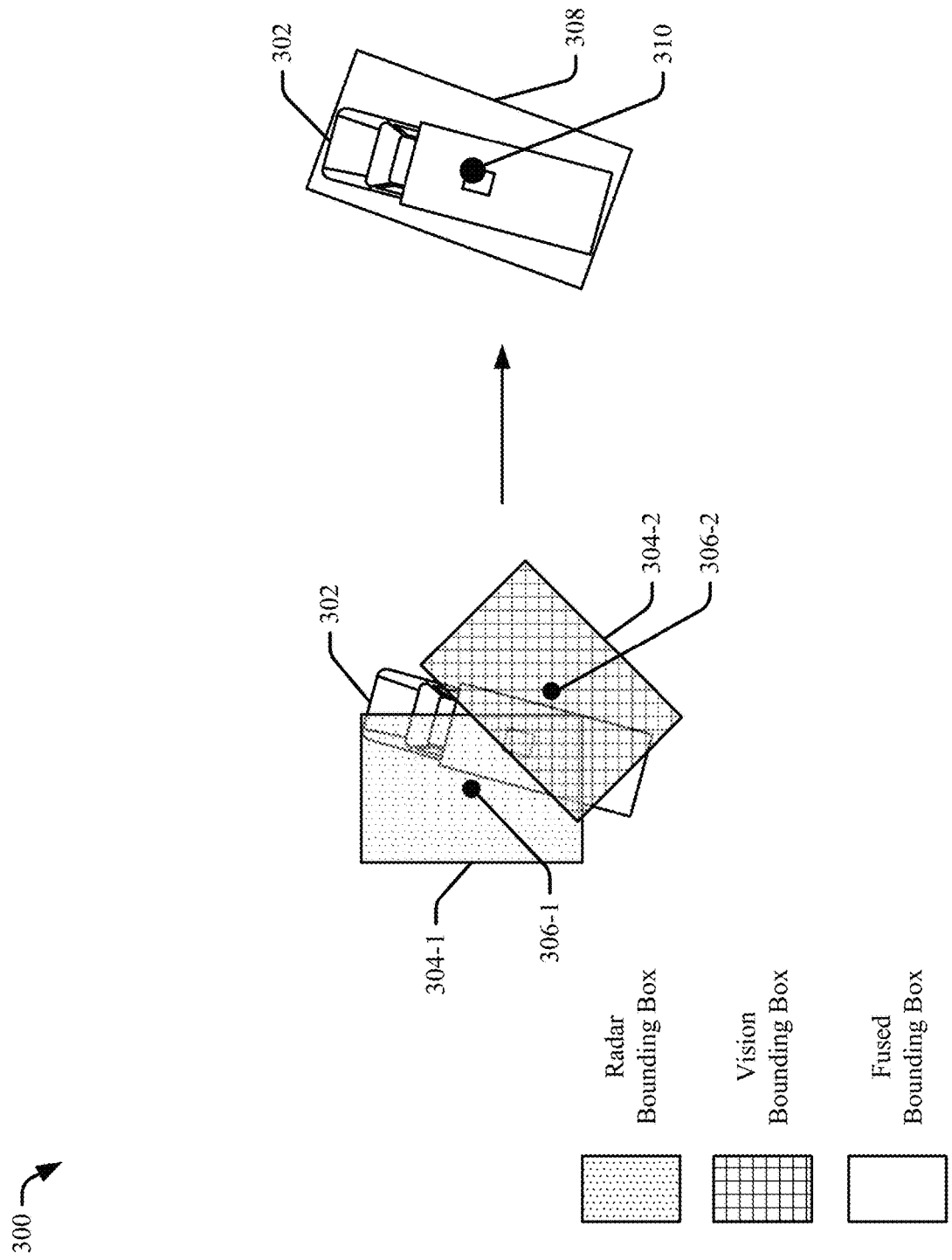
FIG. 3 illustrates a general example of generating a fused object bounding box based on uncertainty, in accordance with techniques of this disclosure.

FIG. 3 illustrates a general example 300 of generating a fused object bounding box based on uncertainty, in accordance with techniques of this disclosure. A sensor fusion system (not shown) may receive sensor data from two or more sensors related to an object 302 and generate bounding boxes 304 based on the sensor data. In this example, a radar bounding box 304-1 and a vision bounding box 304-2 are generated for the object 302. The radar bounding box 304-1 and the sensor bounding box 304-2 include a center point 306-1 and a center point 306-2, respectively.

Based on the center points 306 of the radar bounding box 304-1 and the sensor bounding box 304-2 and other parameters such as the yaw angle, length, and/or width of the bounding boxes 304, the sensor fusion system can generate a fused bounding box 308 with a center point 310 for the object 302. The fused bounding box 308 may be a close approximation of the location, direction, and boundaries of the object 302. Because the fused bounding box 308 is generated from two or more separate bounding boxes that have a certain amount of uncertainty each, in many current fusion systems the fused bounding box 308 could become unstable and jitter around the object 302 from frame to frame. However, generating the fused bounding box 308 based on uncertainty as described herein accounts for the uncertainty including noise in the sensor data and may result in a more robust tracking system and better tracking performance.

Figure 4:
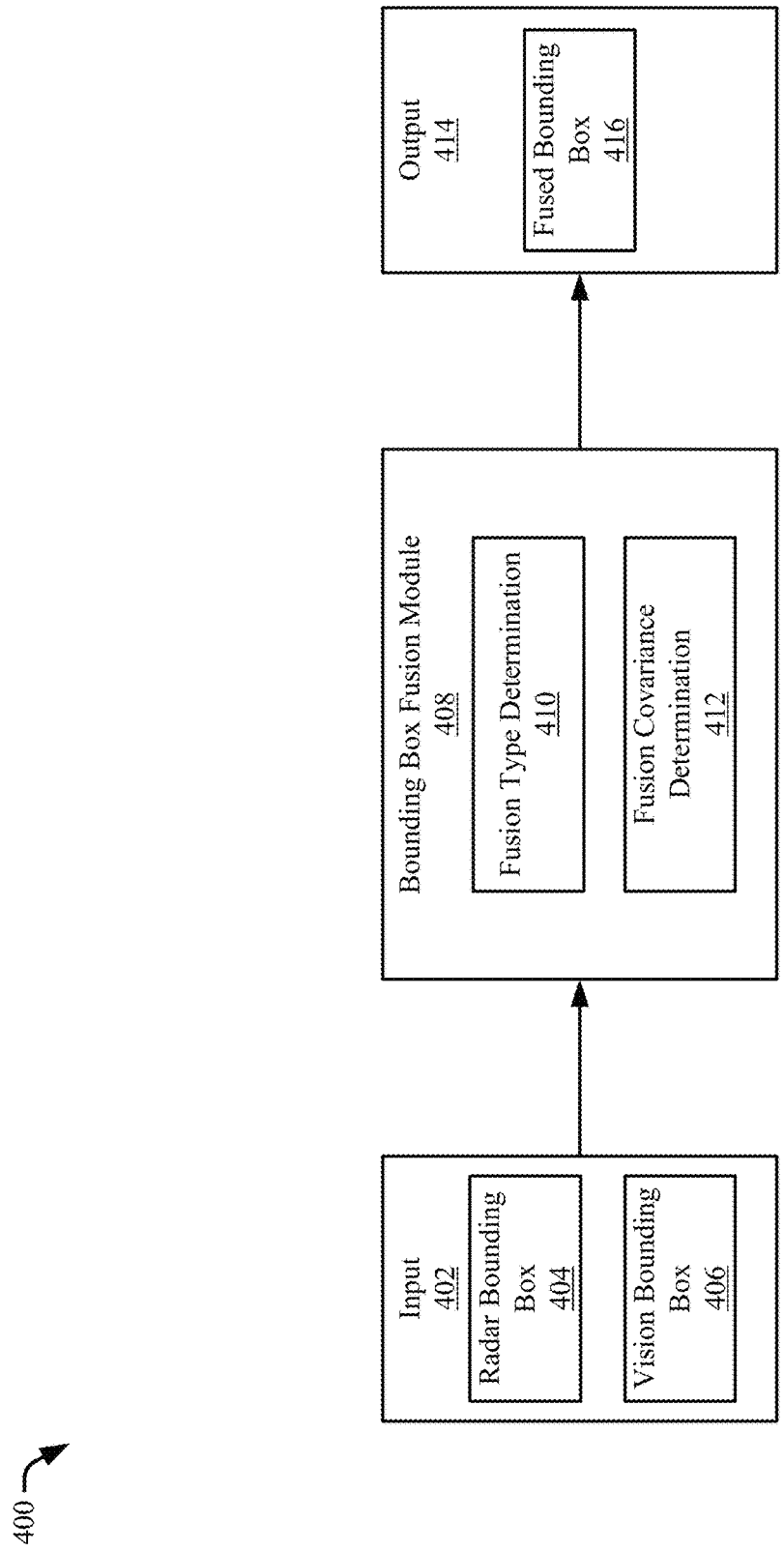
FIG. 4 illustrates an example data flow for generating a fused object bounding box based on uncertainty, in accordance with techniques of this disclosure.

FIG. 4 illustrates an example data flow 400 for generating a fused object bounding box based on uncertainty, in accordance with techniques of this disclosure. Input 402 includes two sensor-based bounding boxes, a radar bounding box 404 and a vision bounding box 406. In some aspects, the input 402 can alternatively or additionally include bounding boxes derived from any other sensor data (e.g., LiDAR data, ultrasonic data, infrared data) alone or in combination with the radar bounding box 404 and/or the vision bounding box 406.

The bounding box fusion module 408 receives the radar bounding box 404 and the vision bounding box 406 and performs a fusion type determination 410. The fusion type determination 410 determines how much uncertainty is inherent in the radar bounding box 404 and the vision bounding box 406 by calculating a discrepancy of certain parameters (e.g., center point, yaw angle, length, width) between the radar bounding box 404 and the vision bounding box 406. For example, the uncertainty can be expressed as a normal distribution $$p(x,y,\theta,l,h,v_x,v_y)=N(x,y,\theta,l,h,v_x,v_y) \qquad \text{Equation 1}$$

where x and y are the coordinates of the center value, $v_x$ and $v_3$, are the velocity of the bounding box for the x-axis and y-axis respectively, $\theta$ is the yaw angle, l is the length, and h is the width of a bounding box. In some aspects, the uncertainty can include the accuracy of the underlying sensor, external conditions such as weather, or other factors. A refined fusion type or a consolidation fusion type is chosen based on whether the discrepancy is less than a threshold value or greater than (e.g., greater than or equal to) the threshold value. A smaller discrepancy that is less than the threshold value implies less uncertainty in the input 402. A larger discrepancy that is greater than or equal to the threshold value implies more uncertainty in the input 402.

Once the fusion type is determined, a fusion covariance determination 412 is performed. For a refined fusion type, the mean value of the parameters or of the normal distributions of the parameters is used to determine an intersection of the radar bounding box 404 and the vision bounding box 406. For a consolidation fusion type, the union of the parameters or of the normal distributions of the parameters is determined.

Based on the fusion covariance determination 412, an output 414 that includes a fused bounding box 416 is generated. The fused bounding box 416 may be a more conservative estimate of the location of the related object and, thus, a safer estimate that results in a more stable tracking performance than other bounding box fusion techniques.

Figure 5:
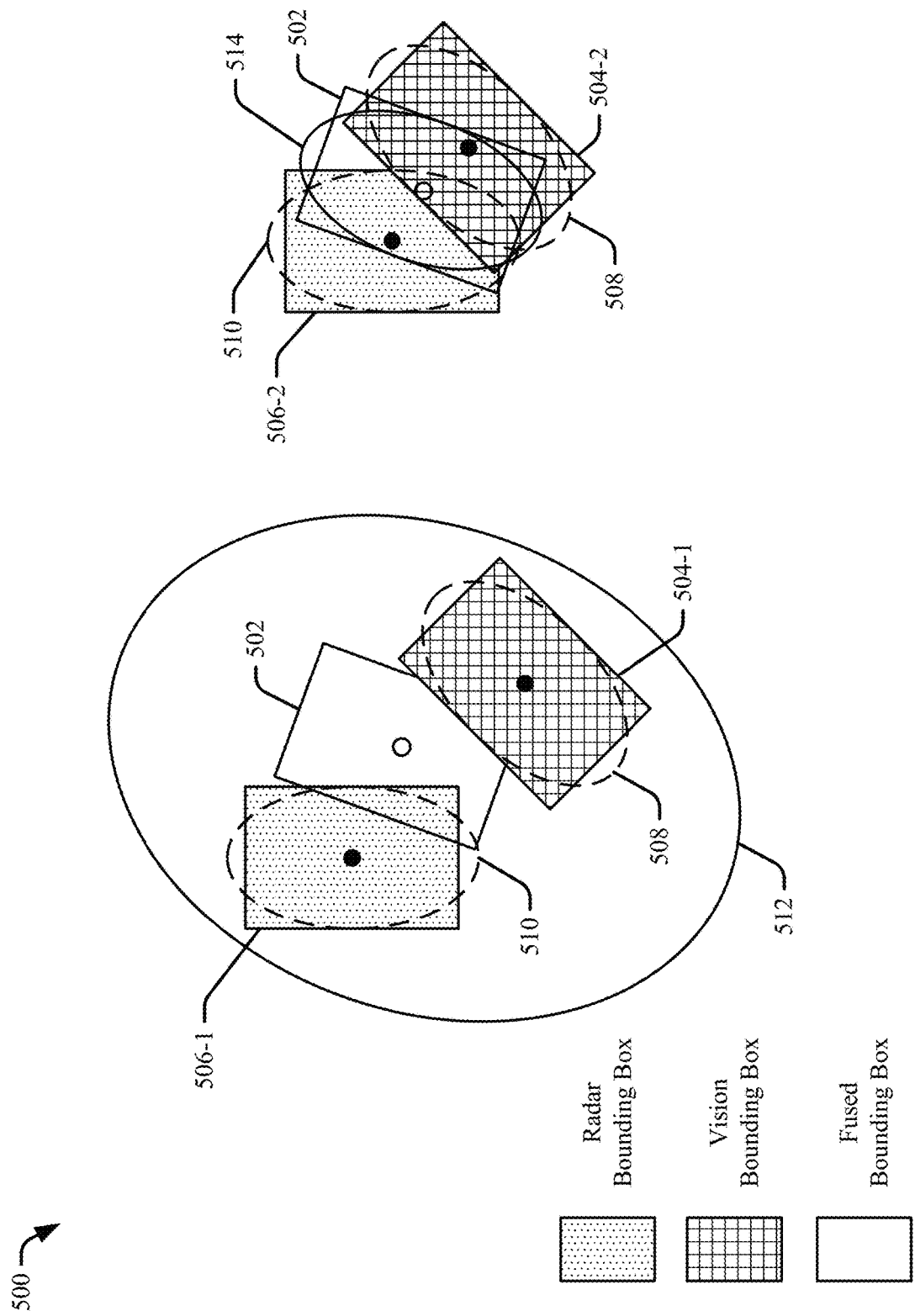
FIG. 5 illustrates the fusion types associated with generating a fused object bounding box based on uncertainty, in accordance with techniques of this disclosure.

FIG. 5 illustrates the fusion types associated with generating a fused object bounding box based on uncertainty, in accordance with techniques of this disclosure. To generate a fused bounding box 502 from sensor-based bounding boxes (e.g., a radar bounding box 504 and a vision bounding box 506), the uncertainty of each respective bounding box may be calculated. In general, a simplified bounding box uncertainty may be represented by a normal distribution $$p(x,y,\theta)=N(x,y,\theta) \quad \text{Equation 2}$$

where x is the center point value along the x-axis, y is the center point value along the y-axis, and θ is the yaw angle. The dashed ovals in FIG. 5 represent the radar bounding box normal distribution 508 and the vision bounding box normal distribution 510. Other parameters such as the length, width, and velocity of the bounding box may also be evaluated. The fused yaw angle can be described by combining the distributions of the radar bounding box 504 and the vision bounding box 506)

$$P(\theta)=p_r N(\theta_r) p_v N(\theta_v) \quad \text{Equation 3}$$

where $N(\theta_r)$ is the normal distribution of the radar bounding box 504, $N(\theta_v)$ is the normal distribution of the vision bounding box 506. $p_r$ and $p_v$ are the coefficients for the radar bounding box 504 and the vision bounding box 506, respectively. Similarly, the center point is distributed by a two-dimensional normal distribution. The fused center point can be described by the combined distribution $$p(x,y)=p_r N(x_r,y_r)+p_v N(x_v,y_v) \quad \text{Equation 4}$$

where $(x_r,y_r)$ and $(x_v,y_v)$ are the center point coordinates of the radar bounding box 504 and the vision bounding box 506, respectively The fusion type depends on the discrepancy between the radar bounding box 504 and the vision bounding box 506. The discrepancy metric can be described as the distance between the center point (and/or other parameters) of the radar bounding box 504 and the vision bounding box 506

$$d=\alpha((x_r-x_v)^2+(x_r-x_v)^2)+\beta((h_r-h_v)^2+(l_r-l_v)^2)+\gamma(v_{x,r}-v_{x,v})^2+(v_{y,r}-v_{y,v})^2) \quad \text{Equation 5}$$

where α, β, and γ are tunable parameters that may be determined from different methods such as analysis of large test data sets. $v_{x,r}$ and $v_{x,v}$ are the x-axis velocity for the bounding box given by radar and vision, respectively. $v_{y,r}$ and $v_{y,v}$ are the y-axis velocity for the bounding box given by radar and vision, respectively. The length and width of the bounding box is denoted by l and h.

The two fusion types, the refined fusion and the consolidation fusion, are chosen based on the value of the discrepancy, d. If the value of the discrepancy is greater than or equal to a threshold value, the consolidation fusion type is used to fuse the bounding boxes. The consolidation fusion type uses the normal distribution of the parameters, which can be described in general as $$p(x)=p_r N(x_r)+p_v N(x_v) \quad \text{Equation 6}$$

where $x_r$ and $x_v$ represents a particular parameter for the radar bounding box 504 and the vision bounding box 506, respectively. The mean value is given as $$E(x)=\mu_x=p_r x_r+p_v x_v \quad \text{Equation 7}$$

and the covariance matrix can then be obtained by $$\text{Var}(x)=p_r C_r+p_v C_v+p_r(x_r-\mu_x)(x_r-\mu_x)^T+p_v(x_v-\mu_x)(x_v-\mu_x)^T \quad \text{Equation 8}$$

where $C_r$ and $C_v$ represent the covariance of the radar bounding box 504 and the vision bounding box 506, respectively. This represents an approximation of the Gaussian mixture 512 or covariance union of the radar bounding box 504-1 and the vision bounding box 506-1.

If the discrepancy is less than the threshold value, the refined fusion type is performed. To refine the uncertainty, the covariance intersection 514 between the radar bounding box 504-2 and the vision bounding box 506-2 is calculated as $$P^{-1}=\omega P_r^{-1}+(1-\omega)P_v^{-1} \quad \text{Equation 9}$$

$$\text{Var}(x)=P^{-1}(\omega P_r^{-1}x_r+(1-\omega)P_v^{-1}x_v) \quad \text{Equation 10}$$

where ω is an assigned weight. Since the weights are given for the mean estimation, $$p_r=P^{-1}\omega P_r^{-1} \quad \text{Equation 11}$$

and $$p_v=P^{-1}(1-\omega)P_v^{-1} \quad \text{Equation 12}$$

the weights for the variance fusion can be obtained as $$\omega=\frac{p_r P_r}{p_r P_r+p_v P_v} \quad \text{Equation 13}$$

Using Equations 6-13, other variables of bounding box description, such as, y, $v_x$, $v_y$, l, h, and θ, can be updated similarly.

In this manner, the uncertainty of the bounding boxes can be considered resulting in a safer and more accurate tracker.

Example Methods

Figure 6:
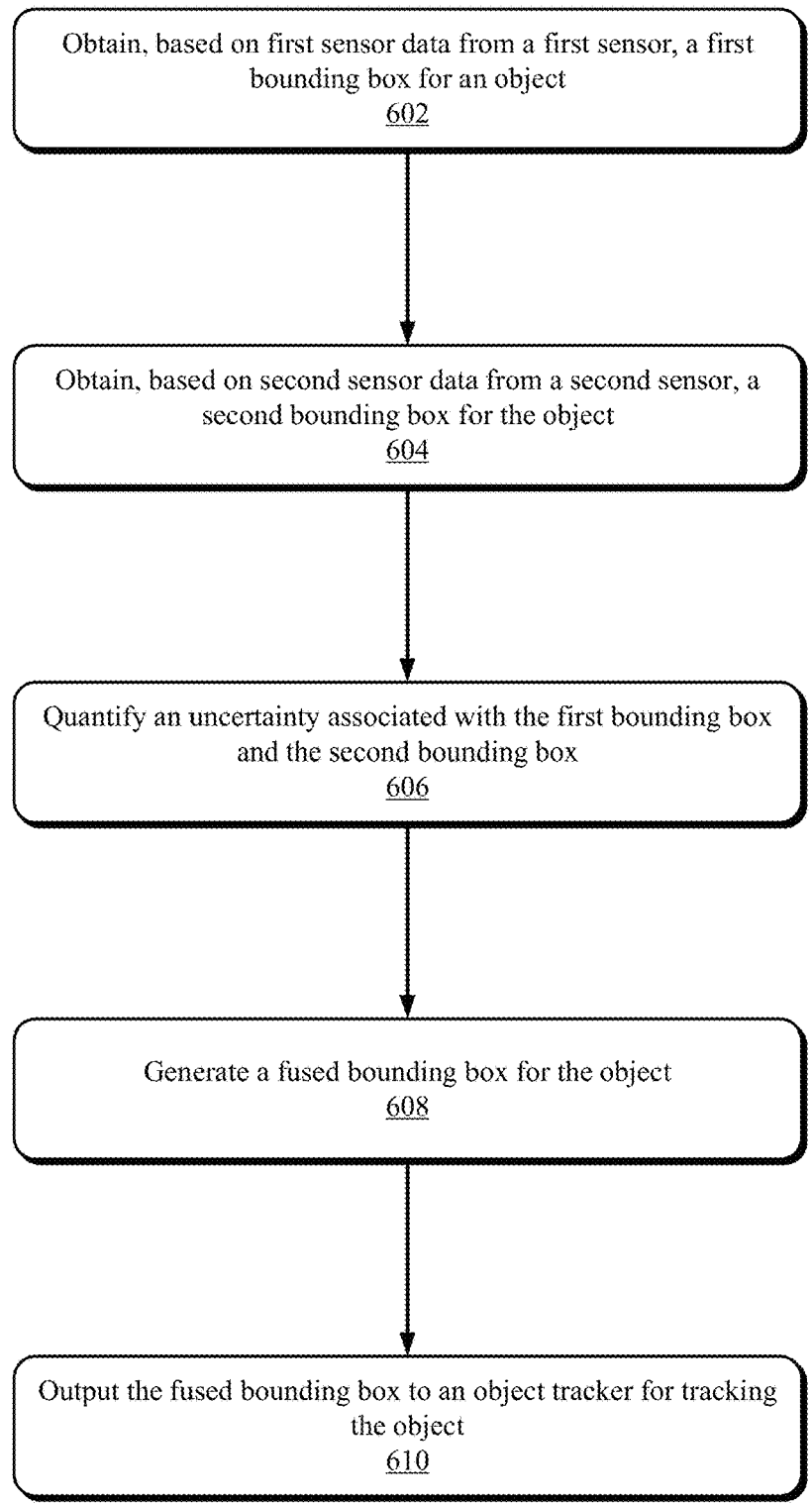
FIG. 6 illustrates an example method for generating a fused object bounding box based on uncertainty, in accordance with techniques of this disclosure.

FIG. 6 illustrates an example method 600 for generating a fused object bounding box based on uncertainty, in accordance with techniques of this disclosure. At step 602, a first bounding box, based on first sensor data from a first sensor, is obtained, and at step 604, a second bounding box, based on second sensor data from a second sensor, is obtained. Throughout this document the first sensor has been described as a radar sensor, and the second sensor has been described as a camera sensor. However, any sensor used for detecting and tracking objects may be used.

At step 606, an uncertainty associated with the first bounding box and the second bounding box is quantified. This uncertainty may be a discrepancy between corresponding parameters of the first bounding box and the second bounding box. For example, the discrepancy may be the distance between the center points of the first bounding box and the second bounding box.

At step 608, a fused bounding box for the object is generated based on the uncertainty. The generation of the fused bounding box may be one of two types, a refined fusion or a consolidation fusion. The refined fusion type finds the intersection between the first bounding box and the second bounding box and is used when the discrepancy is small. The consolidation fusion type calculates the union between the normal distribution of the parameters of the first bounding box and the second bounding box. The consolidation fusion type is used when the discrepancy is larger. This larger discrepancy is considered, and a larger fused bounding box may be generated to compensate for the larger uncertainty.

At step 610, the fused bounding box is output to an object tracker for tracking an object. The fused bounding box generated using the methods described herein may reduce jitteriness or "jumping" by the fused bounding box around the object. By considering the uncertainty, the object tracker may perform better and lead to increased safety.

ADDITIONAL EXAMPLES

Example 1: A method comprising: obtaining, based on first sensor data from a first sensor, a first bounding box for an object in a field of view of the first sensor; obtaining, based on second sensor data from a second sensor, a second bounding box for the object in a field of view of the second sensor; quantifying, based on at least one parameter of the first bounding box and at least one parameter of the second bounding box, an uncertainty associated with the first bounding box and the second bounding box; generating, based on the quantified uncertainty, a fused bounding box for the object; and outputting the fused bounding box to an object tracker for tracking the object.

Example 2: The method of example 1, wherein the at least one parameter of the first bounding box and the at least one parameter of the second bounding box comprises at least one of: a center point of the respective bounding box; a yaw angle associated with the respective bounding box; a length of the bounding box; a width of the bounding box; an x-axis velocity of the bounding box; or a y-axis velocity of the bounding box.

Example 3: The method of example 1, wherein quantifying the uncertainty comprises: determining a discrepancy between the at least one parameter of the first bounding box and the corresponding at least one parameter of the second bounding box.

Example 4: The method of example 3, wherein determining the discrepancy comprises: determining a distance between a center point of the first bounding box and a center point of the second bounding box; determining a difference between a length of the first bounding box and a length of the second bounding box; determining a difference between a width of the first bounding box and a width of the second bounding box; determining a difference between an x-axis velocity of the first bounding box and an x-axis velocity of the second bounding box; and determining a difference between a y-axis velocity of the first bounding box and a y-axis velocity of the second bounding box Example 5: The method of example 3, wherein quantifying the uncertainty further comprises: determining a combined distribution associated with the at least one parameter of the first bounding box and the corresponding at least one parameter of the second bounding box.

Example 6: The method of example 5, wherein generating the fused bounding box comprises: comparing the discrepancy to a threshold value; responsive to the discrepancy being below the threshold value, determining, based on the combined distribution, an intersection between the first bounding box and the second bounding box; and generating, based on the intersection, the fused bounding box.

Example 7: The method of example 6, wherein determining the intersection comprises: determining, based on the combined distribution, a weight for each parameter of the at least one parameter of the first bounding box and the corresponding at least one parameter of the second bounding box.

Example 8: The method of example 6, wherein the intersection is a covariance intersection.

Example 9: The method of example 5, wherein generating the fused bounding box comprises: comparing the discrepancy to a threshold value; responsive to the discrepancy being above or equal to the threshold value, determining, based on the combined distribution, a union of the first bounding box and the second bounding box; and generating, based on the union, the fused bounding box.

Example 10: The method of example 9, wherein determining the union comprises: calculating, based on a mean value of the at least one parameter of the first bounding box and the corresponding at least one parameter of the second bounding box, a covariance matrix representing an approximation of the union.

Example 11: The method of example 10, wherein the approximation of the union is a Gaussian mixture.

Example 12: A system comprising: at least one processor configured to: obtain, based on first sensor data from a first sensor, a first bounding box for an object in a field of view of the first sensor; obtain, based on second sensor data from a second sensor, a second bounding box for the object in a field of view of the second sensor; quantify, based on at least one parameter of the first bounding box and at least one parameter of the second bounding box, an uncertainty associated with the first bounding box and the second bounding box; generate, based on the quantified uncertainty, a fused bounding box for the object; and output the fused bounding box to an object tracker for tracking the object.

Example 13: The system of example 12, wherein the at least one parameter of the first bounding box and the at least one parameter of the second bounding box comprises at least one of: a center point of the respective bounding box; a yaw angle associated with the respective bounding box; a length of the bounding box; a width of the bounding box; an x-axis velocity of the bounding box; or a y-axis velocity of the bounding box.

Example 14: The system of example 12, wherein the at least one processor is configured to quantify the uncertainty by at least: determining a discrepancy between the at least one parameter of the first bounding box and the corresponding at least one parameter of the second bounding box.

Example 15: The system of example 14, wherein the at least one processor is configured to determine the discrepancy by at least: determining a distance between a center point of the first bounding box and a center point of the second bounding box; determining a difference between a length of the first bounding box and a length of the second bounding box; and determining a difference between a width of the first bounding box and a width of the second bounding box.

Example 16: The system of example 14, wherein the at least one processor is configured to generate the fused bounding box by at least: comparing the discrepancy to a threshold value; responsive to the discrepancy being below the threshold value, determining, based a combined distribution of the at least one parameter of the first bounding box and the corresponding at least one parameter of the second bounding box, an intersection between the first bounding box and the second bounding box; and generating, based on the intersection, the fused bounding box.

Example 17: The system of example 16, wherein the at least one processor is configured to determine the intersection by at least: determining, based on the combined distribution, a weight for each parameter of the at least one parameter of the first bounding box and the corresponding at least one parameter of the second bounding box.

Example 18: The system of example 14, wherein the at least one processor is configured to generate the fused bounding box by at least: comparing the discrepancy to a threshold value; responsive to the discrepancy being above or equal to the threshold value, determining, based a combined distribution of the at least one parameter of the first bounding box and the corresponding at least one parameter of the second bounding box, a union between the first bounding box and the second bounding box; and generating, based on the union, the fused bounding box.

Example 19: The system of example 18, wherein the at least one processor is configured to determine the union by at least: calculating, based on a mean value of the at least one parameter of the first bounding box and the corresponding at least one parameter of the second bounding box, a covariance matrix representing an approximation of the union.

Example 20: A computer-readable storage media comprising instructions that, when executed, configure a processor to: obtain, based on first sensor data from a first sensor, a first bounding box for an object in a field of view of the first sensor; obtain, based on second sensor data from a second sensor, a second bounding box for the object in a field of view of the second sensor; quantify, based on at least one parameter of the first bounding box and at least one parameter of the second bounding box, an uncertainty associated with the first bounding box and the second bounding box; generate, based on the quantified uncertainty, a fused bounding box for the object; and output the fused bounding box to an object tracker for tracking the object.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims. Problems associated with tracking performance can occur in other systems. Therefore, although described as a way to improve tracking performance of autonomous or semi-autonomous vehicles, the techniques of the foregoing description can be applied to other systems that would benefit from improved tracking performance of objects. Further, these techniques may also be applied to other systems that use various sensors to detect and track objects.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method comprising:
   obtaining, based on first sensor data from a first sensor, a first bounding box for an object in a field of view of the first sensor;
   obtaining, based on second sensor data from a second sensor, a second bounding box for the object in a field of view of the second sensor;
   quantifying, based on at least one parameter of the first bounding box and at least one parameter of the second bounding box, an uncertainty associated with the first bounding box and the second bounding box, wherein quantifying the uncertainty comprises determining a combined distribution of the at least one parameter of the first bounding box and the corresponding at least one parameter of the second bounding box, and wherein the combined distribution is a sum of distributions of values for the at least one parameter of the first bounding box and the at least one parameter of the second bounding box;
   generating, based on the quantified uncertainty, a fused bounding box for the object; and
   outputting the fused bounding box to an object tracker for tracking the object.

2. The method of claim 1, wherein the at least one parameter of the first bounding box and the at least one parameter of the second bounding box comprises at least one of:
   a center point of the respective bounding box;
   a yaw angle associated with the respective bounding box;
   a length of the respective bounding box;
   a width of the respective bounding box;
   an x-axis velocity of the respective bounding box; or
   a y-axis velocity of the respective bounding box.

3. The method of claim 1, wherein quantifying the uncertainty comprises determining a discrepancy between the at least one parameter of the first bounding box and the corresponding at least one parameter of the second bounding box.

4. The method of claim 3, wherein determining the discrepancy comprises:
   determining a distance between a center point of the first bounding box and a center point of the second bounding box;
   determining a difference between a length of the first bounding box and a length of the second bounding box;
   determining a difference between a width of the first bounding box and a width of the second bounding box;
   determining a difference between an x-axis velocity of the first bounding box and an x-axis velocity of the second bounding box; and
   determining a difference between a y-axis velocity of the first bounding box and a y-axis velocity of the second bounding box.

5. The method of claim 1, wherein generating the fused bounding box comprises:
   comparing the discrepancy to a threshold value;
   responsive to the discrepancy being below the threshold value, determining, based on the combined distribution, an intersection between the first bounding box and the second bounding box; and
   generating, based on the intersection, the fused bounding box.

6. The method of claim 5, wherein determining the intersection comprises determining, based on the combined distribution, a weight for each parameter of the at least one parameter of the first bounding box and the corresponding at least one parameter of the second bounding box.

7. The method of claim 5, wherein the intersection is a covariance intersection, which is a cross-correlation between i) mean and covariance of the at least one parameter of the first bounding box and ii) mean and covariance of the at least one parameter of the second bounding box, the covariance intersection being based on weights and probability mass functions of the at least one parameter of the first bounding box and the at least one parameter of the second bounding box.

8. The method of claim 3, wherein generating the fused bounding box comprises:
   comparing the discrepancy to a threshold value;
   responsive to the discrepancy being above or equal to the threshold value, determining, based on the combined distribution, a union of the first bounding box and the second bounding box; and
   generating, based on the union, the fused bounding box.

9. The method of claim 8, wherein determining the union comprises calculating, based on a mean value of the at least one parameter of the first bounding box and the corresponding at least one parameter of the second bounding box, a covariance matrix or variance representing an approximation of the union.

10. The method of claim 9, wherein the approximation of the union is a Gaussian mixture.

11. A system comprising at least one processor configured to:
obtain, based on first sensor data from a first sensor, a first bounding box for an object in a field of view of the first sensor;
obtain, based on second sensor data from a second sensor, a second bounding box for the object in a field of view of the second sensor;
quantify, based on at least one parameter of the first bounding box and at least one parameter of the second bounding box, an uncertainty associated with the first bounding box and the second bounding box, wherein quantifying the uncertainty comprises determining a combined distribution associated with the at least one parameter of the first bounding box and the corresponding at least one parameter of the second bounding box, and wherein the combined distribution is a sum of distributions of values for the at least one parameter of the first bounding box and the at least one parameter of the second bounding box;
generate, based on the quantified uncertainty, a fused bounding box for the object; and
output the fused bounding box to an object tracker for tracking the object.

12. The system of claim 11, wherein the at least one parameter of the first bounding box and the at least one parameter of the second bounding box comprises at least one of:
a center point of the respective bounding box;
a yaw angle associated with the respective bounding box;
a length of the respective bounding box;
a width of the respective bounding box;
an x-axis velocity of the respective bounding box; or
a y-axis velocity of the respective bounding box.

13. The system of claim 11, wherein the at least one processor is configured to quantify the uncertainty by at least determining a discrepancy between the at least one parameter of the first bounding box and the corresponding at least one parameter of the second bounding box.

14. The system of claim 13, wherein the at least one processor is configured to determine the discrepancy by at least:
determining a distance between a center point of the first bounding box and a center point of the second bounding box;
determining a difference between a length of the first bounding box and a length of the second bounding box;
determining a difference between a width of the first bounding box and a width of the second bounding box;
determining a difference between an x-axis velocity of the first bounding box and an x-axis velocity of the second bounding box; and
determining a difference between a y-axis velocity of the first bounding box and a y-axis velocity of the second bounding box.

15. The system of claim 13, wherein the at least one processor is configured to generate the fused bounding box by at least:
comparing the discrepancy to a threshold value;
responsive to the discrepancy being below the threshold value, determining, based the combined distribution of the at least one parameter of the first bounding box and the corresponding at least one parameter of the second bounding box, an intersection between the first bounding box and the second bounding box; and
generating, based on the intersection, the fused bounding box.

16. The system of claim 15, wherein the at least one processor is configured to determine the intersection by at least determining, based on the combined distribution, a weight for each parameter of the at least one parameter of the first bounding box and the corresponding at least one parameter of the second bounding box.

17. The system of claim 13, wherein the at least one processor is configured to generate the fused bounding box by at least:
comparing the discrepancy to a threshold value;
responsive to the discrepancy being above or equal to the threshold value, determining, based the combined distribution of the at least one parameter of the first bounding box and the corresponding at least one parameter of the second bounding box, a union between the first bounding box and the second bounding box; and
generating, based on the union, the fused bounding box.

18. The system of claim 17, wherein the at least one processor is configured to determine the union by at least calculating, based on a mean value of the at least one parameter of the first bounding box and the corresponding at least one parameter of the second bounding box, a covariance matrix or variance representing an approximation of the union.

19. A computer-readable storage media comprising instructions that, when executed, configure a processor to:
obtain, based on first sensor data from a first sensor, a first bounding box for an object in a field of view of the first sensor;
obtain, based on second sensor data from a second sensor, a second bounding box for the object in a field of view of the second sensor;
quantify, based on at least one parameter of the first bounding box and at least one parameter of the second bounding box, an uncertainty associated with the first bounding box and the second bounding box, wherein quantifying the uncertainty comprises determining a combined distribution associated with the at least one parameter of the first bounding box and the corresponding at least one parameter of the second bounding box, and wherein the combined distribution is a sum of distributions of values for the at least one parameter of the first bounding box and the at least one parameter of the second bounding box;
generate, based on the quantified uncertainty, a fused bounding box for the object; and
output the fused bounding box to an object tracker for tracking the object.

* * * * *